(12) United States Patent
Alvarado Valverde

(10) Patent No.: US 8,998,126 B2
(45) Date of Patent: Apr. 7, 2015

(54) LIFT GENERATING DEVICE

(75) Inventor: Juan A. Alvarado Valverde, Port Orange, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 221 days.

(21) Appl. No.: 13/601,242

(22) Filed: Aug. 31, 2012

(65) Prior Publication Data

US 2013/0062454 A1 Mar. 14, 2013

Related U.S. Application Data

(60) Provisional application No. 61/534,530, filed on Sep. 14, 2011.

(51) Int. Cl.
B64C 39/06 (2006.01)
(52) U.S. Cl.
CPC .................................... B64C 39/064 (2013.01)
(58) Field of Classification Search
CPC .................................................. B64C 39/064
USPC ........ 244/12.1–12.3, 23 B, 23 C, 7 R, 10, 21, 244/52; 446/36, 37
See application file for complete search history.

(56) References Cited

U.S. PATENT DOCUMENTS

| 4,796,836 | A | * | 1/1989 | Buchelt | 244/23 R |
|---|---|---|---|---|---|
| 5,035,377 | A | | 7/1991 | Buchelt | |
| 5,996,933 | A | | 12/1999 | Schier | |
| 6,270,036 | B1 | | 8/2001 | Lowe, Jr. | |
| 7,249,732 | B2 | * | 7/2007 | Sanders et al. | 244/23 A |
| 7,836,678 | B1 | | 11/2010 | Yan et al. | |
| 8,020,804 | B2 | | 9/2011 | Yoeli | |
| 2004/0164203 | A1 | * | 8/2004 | Billiu | 244/35 R |
| 2011/0215191 | A1 | | 9/2011 | Gramling | |

FOREIGN PATENT DOCUMENTS

WO    WO 2010/067325    6/2010

* cited by examiner

Primary Examiner — Philip J Bonzell
Assistant Examiner — Nicholas McFall
(74) Attorney, Agent, or Firm — Womble Carlyle Sandridge & Rice LLP

(57) ABSTRACT

A lift generating device is provided enabling vertical flight. The lift generating device includes a first revolution structure having a funnel shape and a second revolution structure having a funnel shape. Each revolution structure includes a circular open surface and an open stem. The second revolution structure is attached to the first revolution structure by a plurality of connectors so as to form a gap between the first revolution structure and the second revolution structure. A propeller is coupled to an open stem at a bottom end of the first revolution structure and a motor is operatively connected to the propeller to provide power for the propeller to suction air into the lift generating device.

8 Claims, 15 Drawing Sheets

US 8,998,126 B2

LIFT GENERATING DEVICE

CROSS-REFERENCE TO RELATED APPLICATION

This application claims the benefit of U.S. Provisional Patent Application Ser. No. 61/534,530 filed on Sep. 14, 2011. The specification and drawings of the provisional patent application are specifically incorporated by reference herein.

TECHNICAL FIELD

Embodiments of the present invention generally relate to aircraft lift mechanisms and, more specifically, to lift generating devices for vertical flight vehicles.

BACKGROUND

When used on airplanes, propellers, ducted fans, and turbines provide the air speed required for the wings to generate lift. Current vertical flight vehicle configurations (e.g., VTOL) may propel the air downwards in order to generate lift. The speed of the airflow does not create any lift. The incoming air is directly suctioned from the surroundings by a propeller. Although aircraft that fly vertically by using various types of propelling devices may have great maneuverability and also the capacity for take-off and landing on relatively small areas, such aircraft consume high amounts of energy in order to generate the required lift, which makes them somewhat inefficient compared to other types of aircraft. The efficiency of the system is further limited by the air drag at high revolution rates.

SUMMARY

The disclosed embodiments are directed to a vertical flight vehicle configuration that includes a series of surfaces of revolution in the shape of funnels. The geometry of the system redirects the incoming airflow of a propelling device, creating extra lift during flight.

In exemplary embodiments, the efficiency of propelling devices used for vertical flight can be increased by redirecting the airflow through a series of surfaces of revolution. Redirecting the airflow creates a difference in pressure on the surface thereby generating a lifting force. This lifting force can be added to the force already produced by the propelling device resulting in a considerable increase in system efficiency.

In one embodiment, a lift generating device is provided for enabling vertical flight. The lift generating device includes a first revolution structure having a funnel shape and a second revolution structure having a funnel shape. Each revolution structure includes a circular open surface and an open stem. The second revolution structure is attached to the first revolution structure by a plurality of connectors so as to form a gap between the first revolution structure and the second revolution structure. A propeller is coupled to an open stem at a bottom end of the first revolution structure and a motor is operatively connected to the propeller to provide power for the propeller to suction air into the lift generating device.

In one embodiment, a lift generating structure is provided for enabling vehicle vertical flight. The lift generating structure includes a lift generating device having a funnel-shaped first revolution structure and a funnel-shaped second revolution structure. The first revolution structure is mounted in the second revolution structure and separated by a predetermined gap, such that airflow on an upper side of the first revolution structure decreases air pressure on the lift generating device while air pressure on a lower side of the first revolution structure remains unchanged resulting in a lifting force. The lift generating structure further includes a fuselage structure and a holding structure affixed to the fuselage structure for mounting of the lift generating device. A plurality of motor and propeller combinations generates horizontal motion of the vehicle. A plurality of side arms is attached to the fuselage structure for supporting each of the motor and propeller combinations.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following detailed description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

The embodiments described herein can be applied to quadrotors and other vehicles that engage in vertical flight. Quadrotors are generally referred to as rotorcraft as opposed to fixed wing aircraft. The embodiments apply to quadrotors since such vehicles move by pitch and roll. Vertical take off and landing (VTOL) vehicles can use the embodiments described if the geometry of VTOL vehicles is adjusted properly. In some embodiments, the lift generating device can be added to each rotor to increase the lift considerably. In other embodiments, there could be two or more lift generating devices generating lift (while counteracting each other's torque to prevent the vehicle from spinning), and a propeller moving the vehicle horizontally.

Quadrotors have several advantages over VTOL aircraft and helicopters that make the lift generating device better-suited to quadrotors. One advantage is that quadrotors use fixed pitch rotors and variations in motor speed for vehicle control. VTOL aircraft require complex mechanical control linkages for rotor actuation. Another advantage is that using four rotors ensures that each rotor has a smaller diameter than an equivalent main rotor on a helicopter resulting in less kinetic energy storage during flight. The lift generating devices and rotors can also be enclosed in exemplary embodiments.

Figure 1:
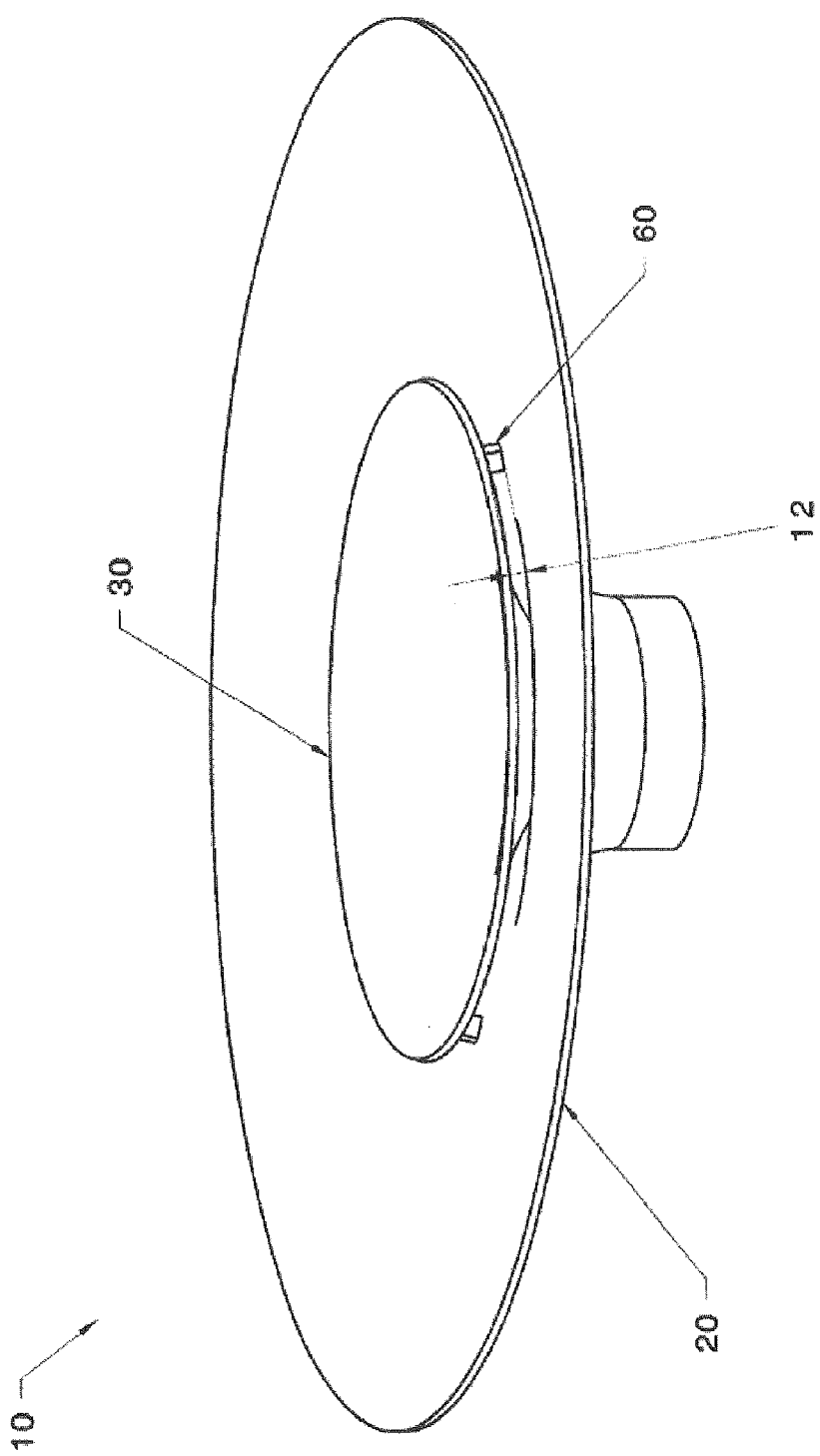
FIG. 1 illustrates a perspective front view of a lift generating device in accordance with an exemplary embodiment.
Figure 2:
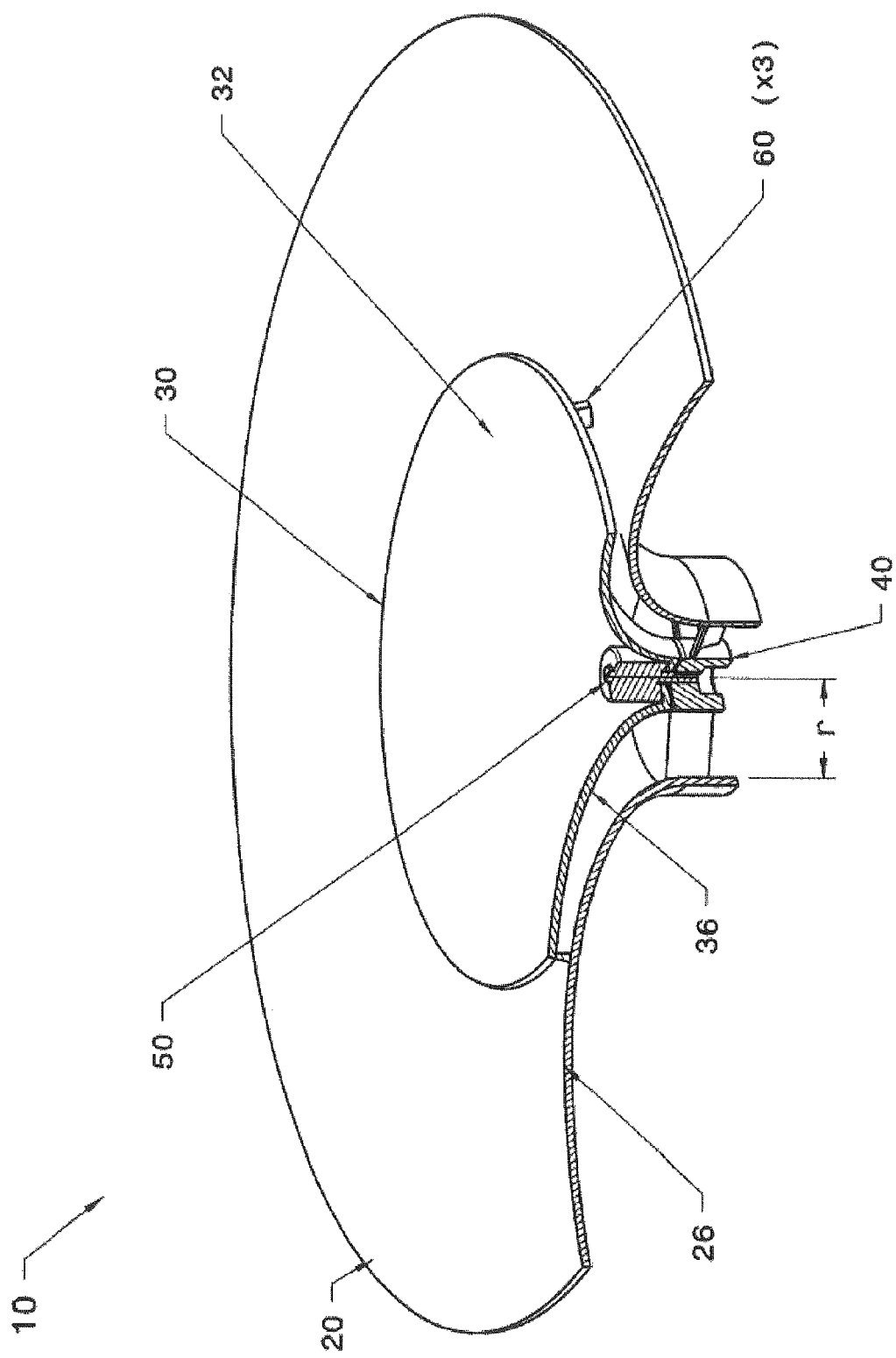
FIG. 2 illustrates a cross-sectional view of the lift generating device in accordance with an exemplary embodiment.
Figure 3:
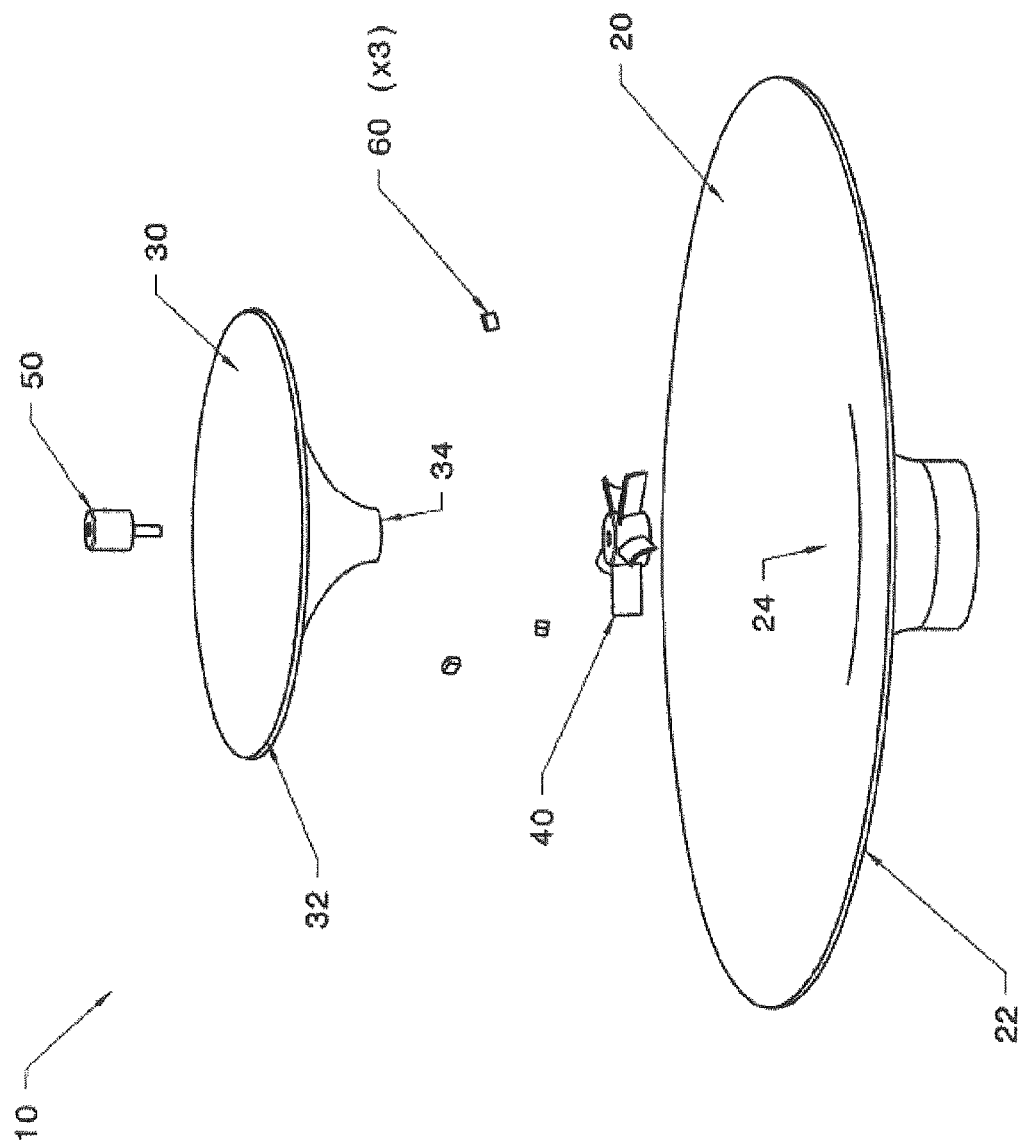
FIG. 3 illustrates an exploded view of the lift generating device in accordance with an exemplary embodiment.

FIGS. 1-3 show a lift generating device 10 for vertical flight in accordance with an exemplary embodiment. The lift generating device 10 includes a first revolution structure 20, a second revolution structure 30 attached to the first revolution structure 20, a gap 12 formed between the first revolution structure 20 and the second revolution structure 30, a propeller 40 inserted into the bottom end of the first revolution structure 20, and a motor 50 operatively connected to the propeller 40.

The lift generating device 10 can redirect the incoming airflow through the first revolution structure 20 and the second revolution structure 30 before reaching the propeller 40. This action can create a difference in pressure that generates an extra upwards force that is added to the lift already produced by the propeller 40, increasing the efficiency considerably.

The first revolution structure 20 can have a funnel shape including a circular open surface 22 and an open stem 24 having a radius "r", both resulting from a 360 degree rotation of curve 26.

The second revolution structure 30 can have a funnel shape including an open surface 32 and an open stem 34, both resulting from a 360 degree rotation of curve 36.

The shape of curve 36 can be optimized based on the shape of curve 26 in order to maintain the velocity of the airflow constant through the space between the first revolution structure 20 and the second revolution structure 30.

The open stem 34 of the second revolution structure 30 can be inserted into the open stem 24 of the first revolution structure 20, forming a gap 12 between the two structures.

Connectors 60 can be placed between the first revolution structure 20 and the second revolution structure 30. The connectors 60 can be evenly distributed around the perimeter of the second revolution structure 30 such that the connectors do not disturb the airflow.

The size of the second revolution structure 30 can depend on the gap 12. The gap 12 can be more than 10% the size of the radius "r", as long as the velocity of the airflow remains constant through the gap 12.

The first revolution structure 20, the second revolution structure 30, and the connectors 60 can be made of a sturdy and lightweight material, for example, carbon fiber or fiberglass. The first revolution structure 20, the second revolution structure 30, and the connectors 60 can be made by molding, or injection molding.

The propeller 40 can be a commercially available propeller or ducted fan. The propeller 40 can have an outer radius equal to the radius "r". The propeller 40 can be connected on the open stem 34 of the first revolution structure 20. The propeller 40 can provide the required power to suction air into the lift generation device 10.

Due to the shape of the first revolution structure 20 and the second revolution structure 30, the air can be forced to flow through the gap 12. As a result, the air flowing on top of the first revolution structure 20 can decrease the pressure, while the pressure below the first revolution structure 20 remains unchanged, therefore extra lift can be generated by just redirecting the incoming air.

Flaps (not shown) can be attached near the gap 12 where the air enters. Nozzles (not shown) can be added near an air output in order to control the lift generation device 10.

A rear rotor can be added to stop the rotation of the vehicle (not shown) in view of the angular momentum. The rear rotor can be a commercially available rear rotor, for example, a rear rotor for a helicopter. The rear rotor can allow the user to control the vehicle.

In another embodiment, a plurality of lift generation devices 10 can be installed on the same vehicle in order to provide more lift. In this alternate embodiment, if the rotation of one propeller 40 is inverted with respect to another propeller 40, then the rotation would be cancelled and no extra rear rotor may be needed.

In some embodiments, the first revolution structure 20 and the second revolution structure 30 can be made using a plurality of thin "ribs" pasted (evenly separated) to a circular and hollow base where the propeller 40 may be introduced. Then, the structures can be covered with paper or plastic in order to resemble the original shape.

The regulation of the power of the propeller 40 regulates the force produced by the lift generation devices 10, since it depends on the airflow through the propeller 40.

Figure 4:
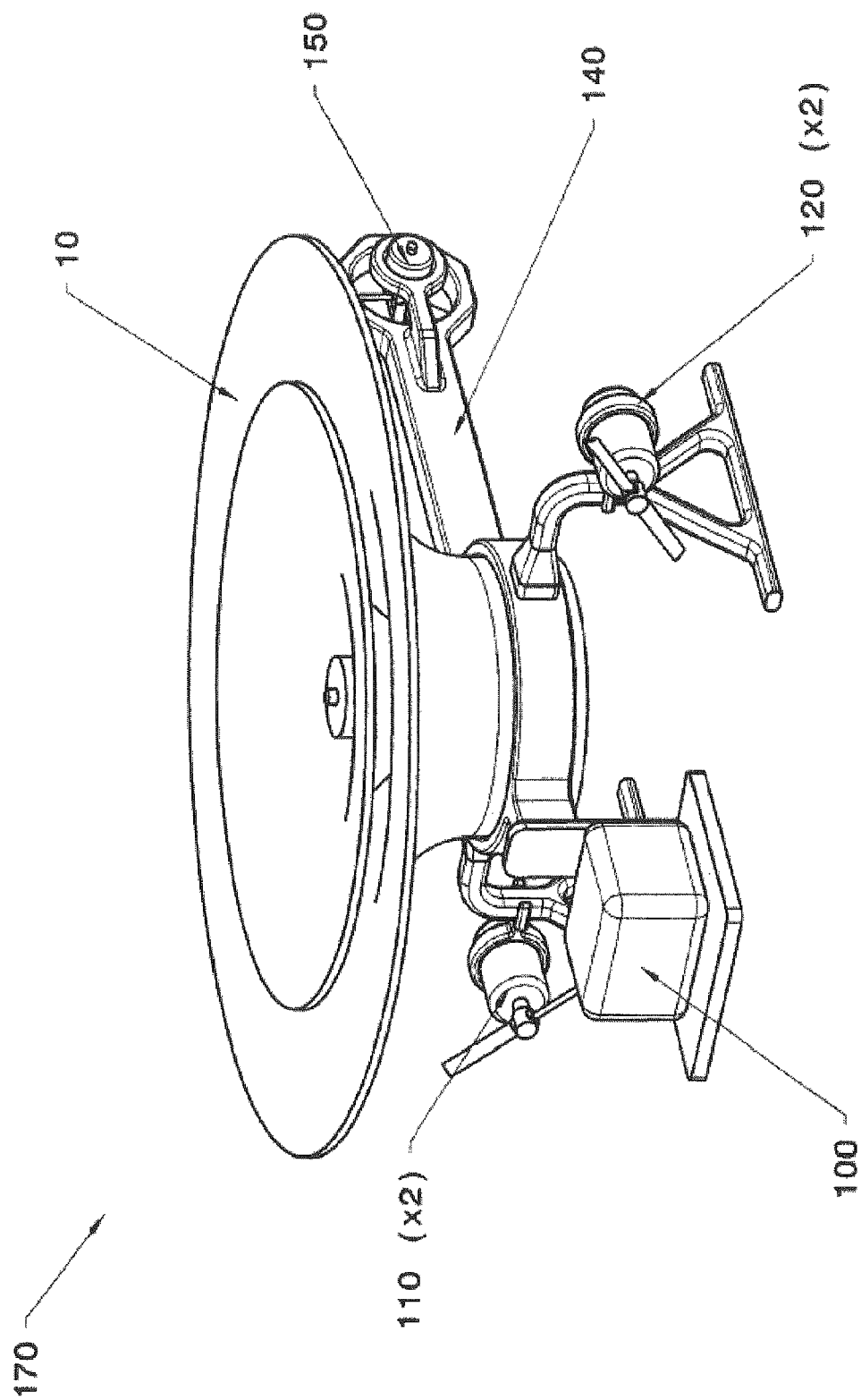
FIG. 4 illustrates an exemplary embodiment of a flying vehicle using a single lift generating device.

FIGS. 4-9 illustrate exemplary embodiments of flying vehicles using lift generating device assemblies in various configurations. FIG. 4 illustrates an exemplary embodiment of a flying vehicle 170 using a single lift generating device 10. This embodiment includes two motors 110 with propellers for horizontal motion in forward and backward directions. Connectors 120 connect the motors 110 to fuselage structure 140. Payload 100 can include, but is not limited to, power systems such as batteries and engines, control systems such as onboard computers and communications systems, cameras, cargo, passengers, weapons, etc. Back motor 150 provides vehicle counter-rotation.

Figure 5:
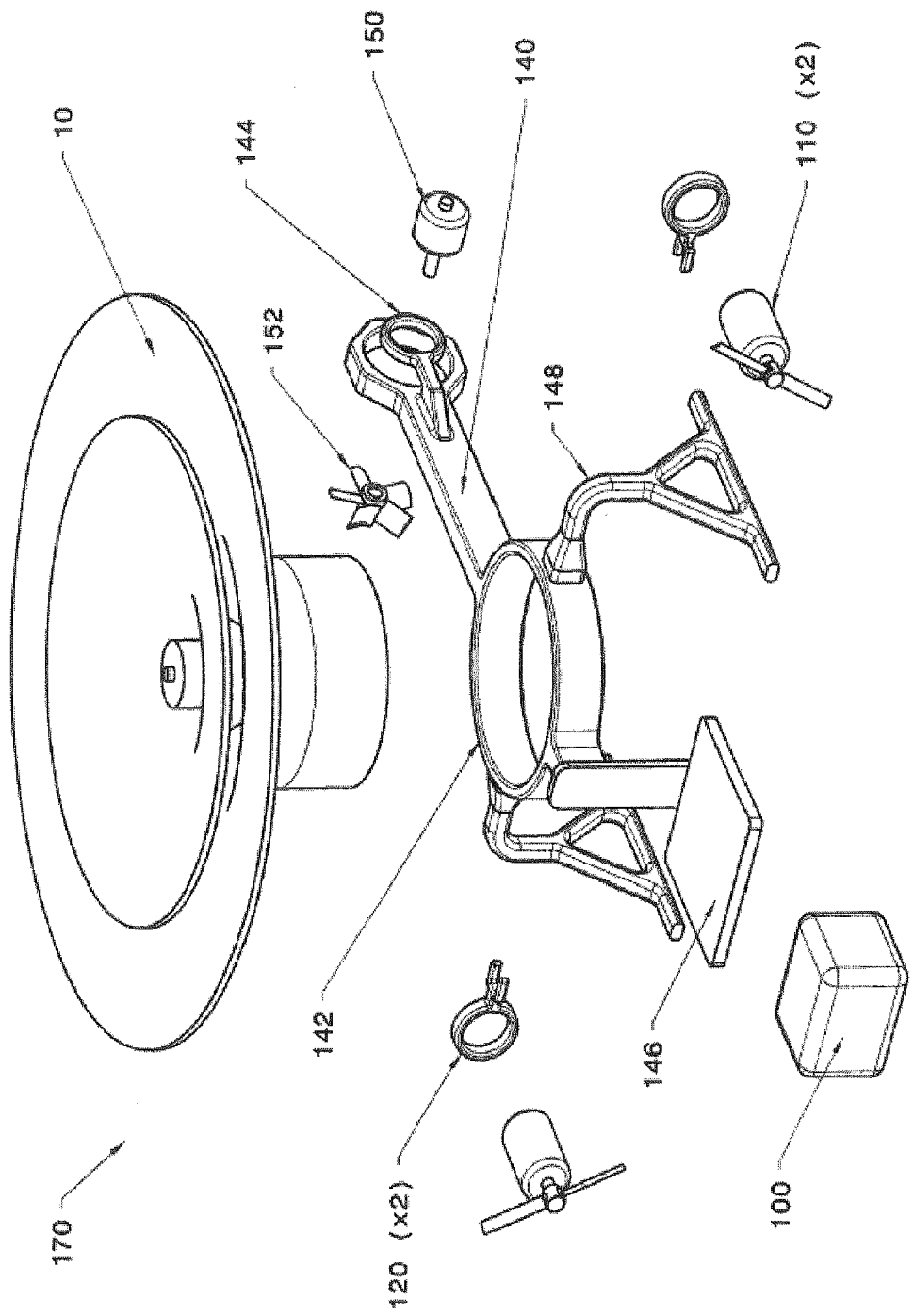
FIG. 5 illustrates an exploded view of the flying vehicle in the embodiment of FIG. 4.

FIG. 5 illustrates an exploded view of the flying vehicle 170 in the embodiment of FIG. 4. The lift generating device 10 is mounted in holding structure 142, affixed at a first end of fuselage structure 140, and includes a horizontally-oriented annular structure 142 (e.g., circular opening) for mounting of the lift generating device 10. Attached to the holding structure 142 is a plurality of side arms 148. The motor/propeller assembly 110 is secured to side arms 148 by connectors 120. The back motor 150 is mounted in the circular opening in vertically-oriented annular structure 144 at the other end of fuselage 140 where the motor 150 is secured in place. Platform 146 supports payload structure 100. Also shown in FIG. 5 is propeller 152 for back motor 150.

Figure 6:
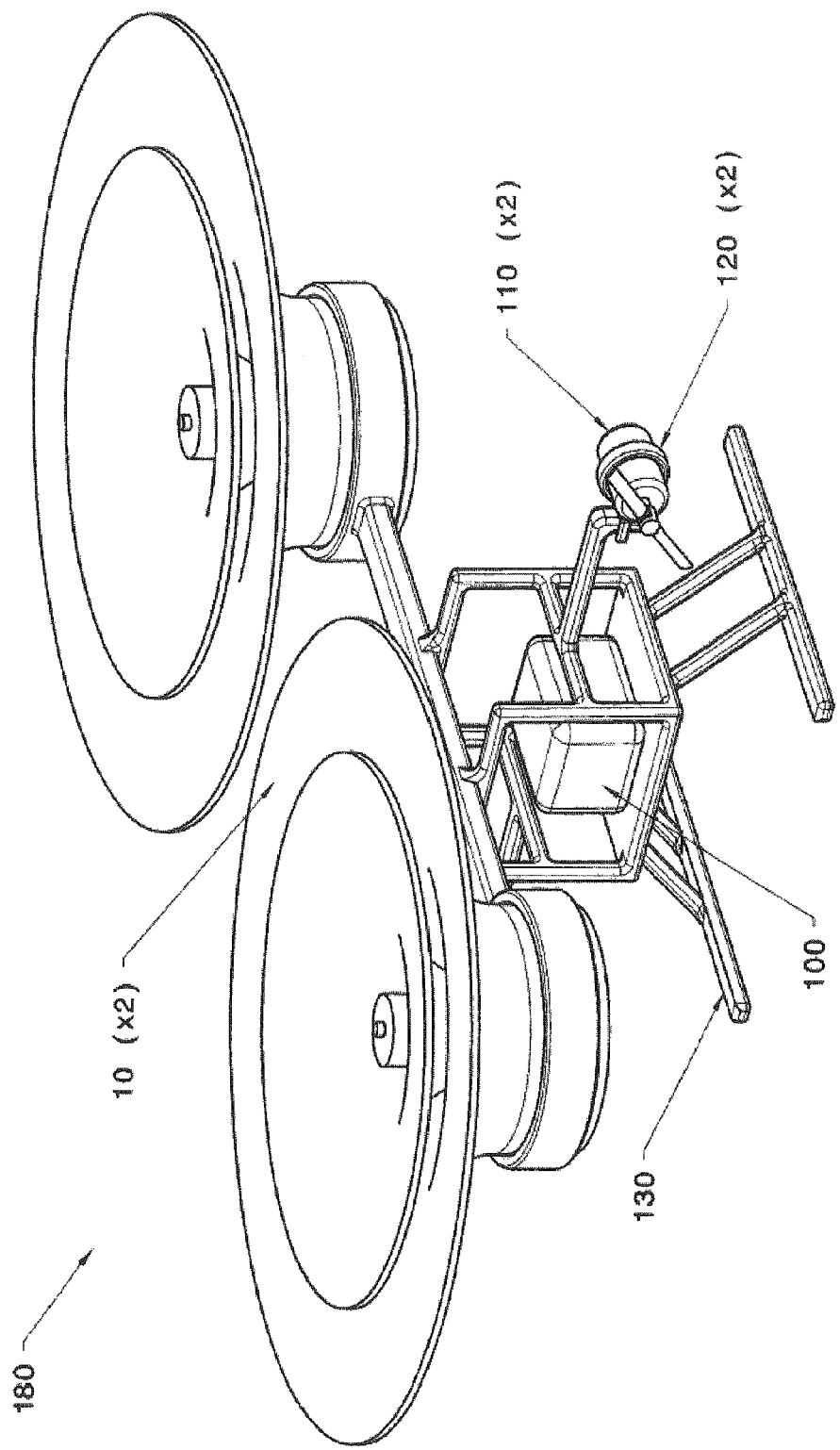
FIG. 6 illustrates an exemplary embodiment of a flying vehicle using two lift generating devices.

FIG. 6 illustrates an exemplary embodiment of a flying vehicle 180 using a plurality of lift generating devices 10. This embodiment includes two lift generating devices 10 and two motor/propeller assemblies 110 mounted by side arms 134 to frame-shaped fuselage structure 130. Connectors 120 secure the motors 110 to fuselage structure 130. Payload 100 is supported by a platform that forms the bottom surface of fuselage structure 130. Fuselage structure includes a landing gear structure 136 that is mounted or affixed to the fuselage structure 130.

Figure 7:
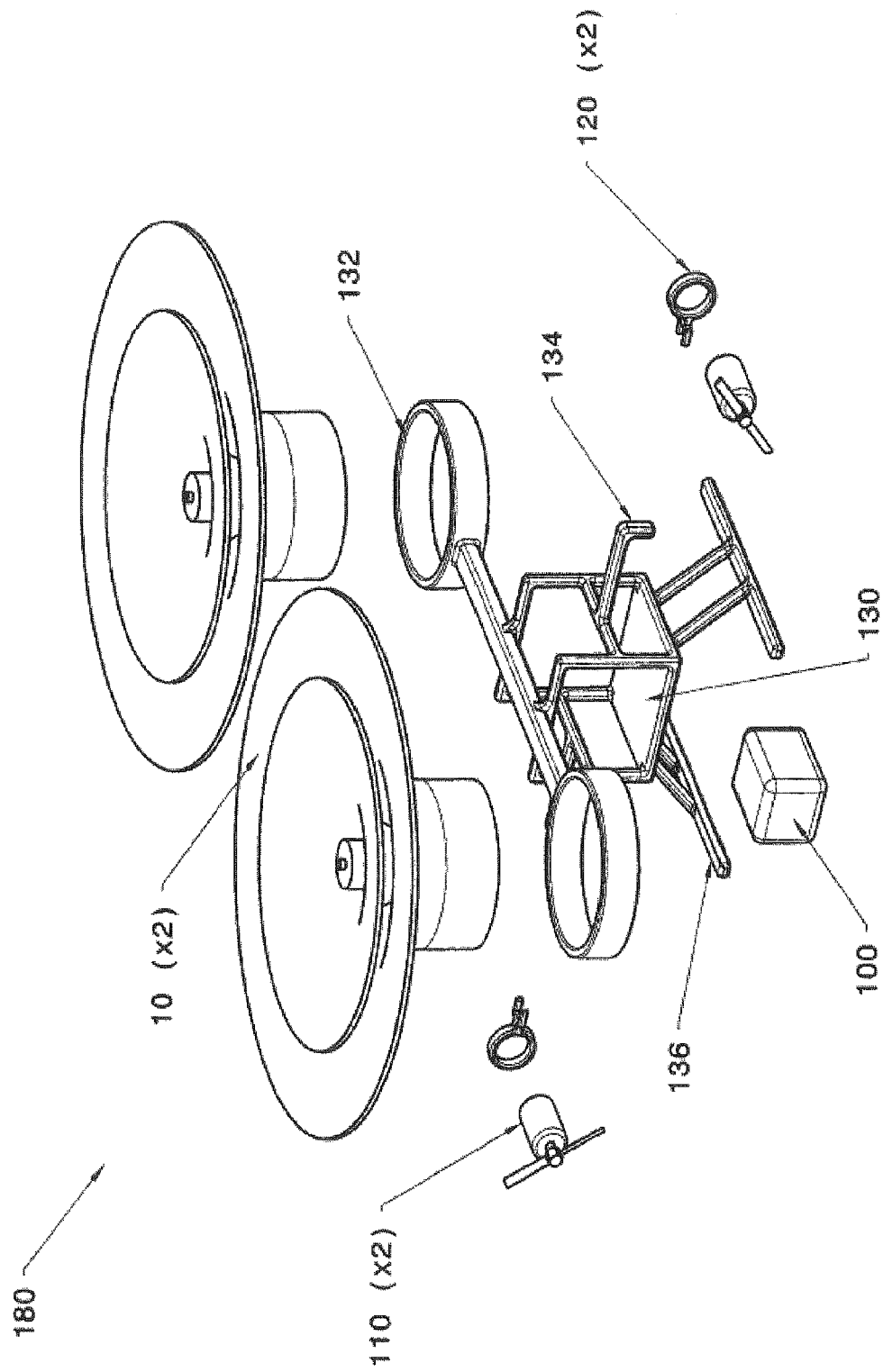
FIG. 7 illustrates an exploded view of the flying vehicle in the embodiment of FIG. 6.

FIG. 7 illustrates an exploded view of the flying vehicle 180 in the embodiment of FIG. 6. The lift generating devices 10 are mounted in holding structures 132 affixed at both a first end and a second end of horizontal bar structure 138. Each holding structure 132 includes a horizontally-oriented annular structure (e.g., circular opening) at each end for mounting of each lift generating device 10. Attached to the horizontal bar structure 138 is a frame-shaped fuselage structure 130. A plurality of side arms 134 are attached to the fuselage structure 130 for securing motor/propeller assemblies 110. The motor/propeller assemblies 110 are secured to side arms 134 by connectors 120. No back motor is needed in this embodiment since the rotation of each motor/propeller assembly is inverted with respect to the other motor/propeller assembly. Fuselage structure 130 supports payload structure 100 on a lower platform surface.

Figure 8:
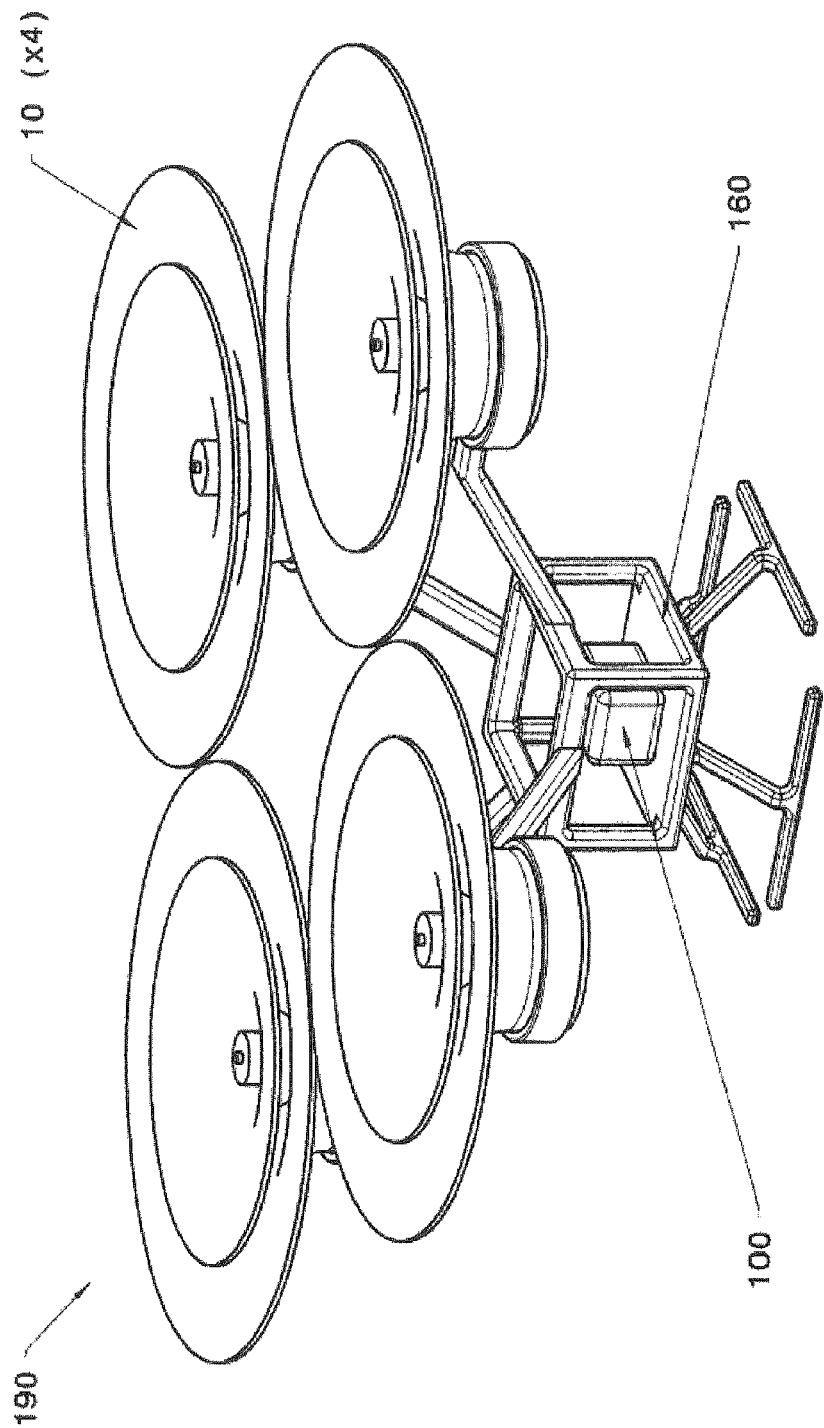
FIG. 8 illustrates an exemplary embodiment of a flying vehicle using four lift generating devices.

FIG. 8 illustrates an exemplary embodiment of a flying vehicle 190 using a plurality of lift generating devices 10. This embodiment includes four lift generating devices 10 and resembles the configuration and function of a quadrotor. Payload 100 is supported by fuselage structure 160. Landing gear structure 166 is mounted or otherwise affixed to fuselage structure 160.

Figure 9:
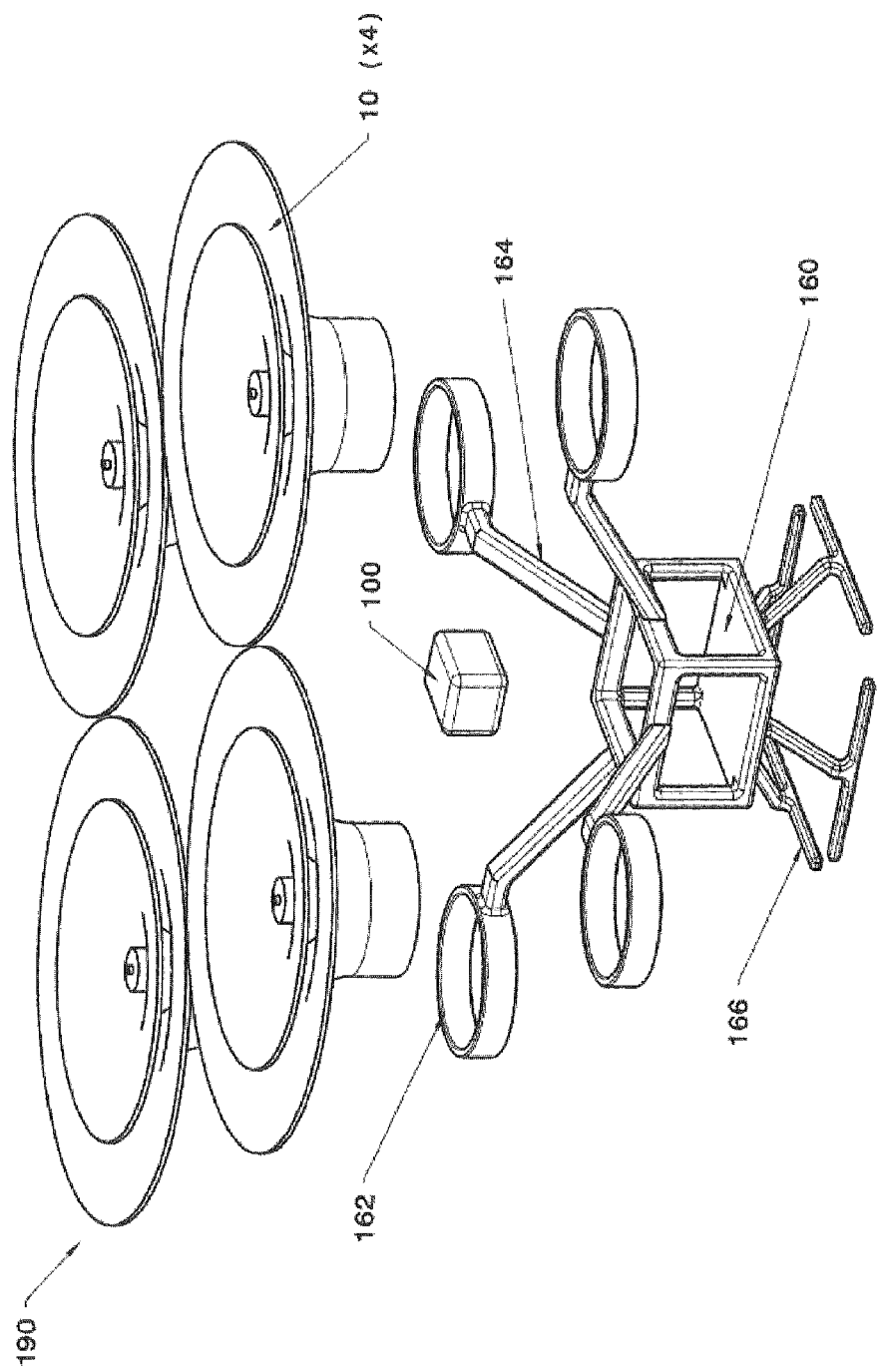
FIG. 9 illustrates an exploded view of the flying vehicle in the embodiment of FIG. 8.

FIG. 9 illustrates an exploded view of the flying vehicle 190 in the embodiment of FIG. 8. The lift generating devices 10 are mounted in each of four holding structures 162 mounted to fuselage 160 by side arms 164. Each holding structure 162 includes a horizontally-oriented annular structure (e.g., circular opening) for mounting of each lift generating device 10. The holding structures 162 are mounted to frame-shaped fuselage structure 160 by side arms 164 affixed to a top portion of fuselage structure 160 and oriented in an angular direction away from the fuselage structure 160. Fuselage structure 160 includes a lower surface platform that supports payload structure 100. Landing gear structure 166 can be attached or otherwise mounted to the fuselage structure 160.

Figure 10:
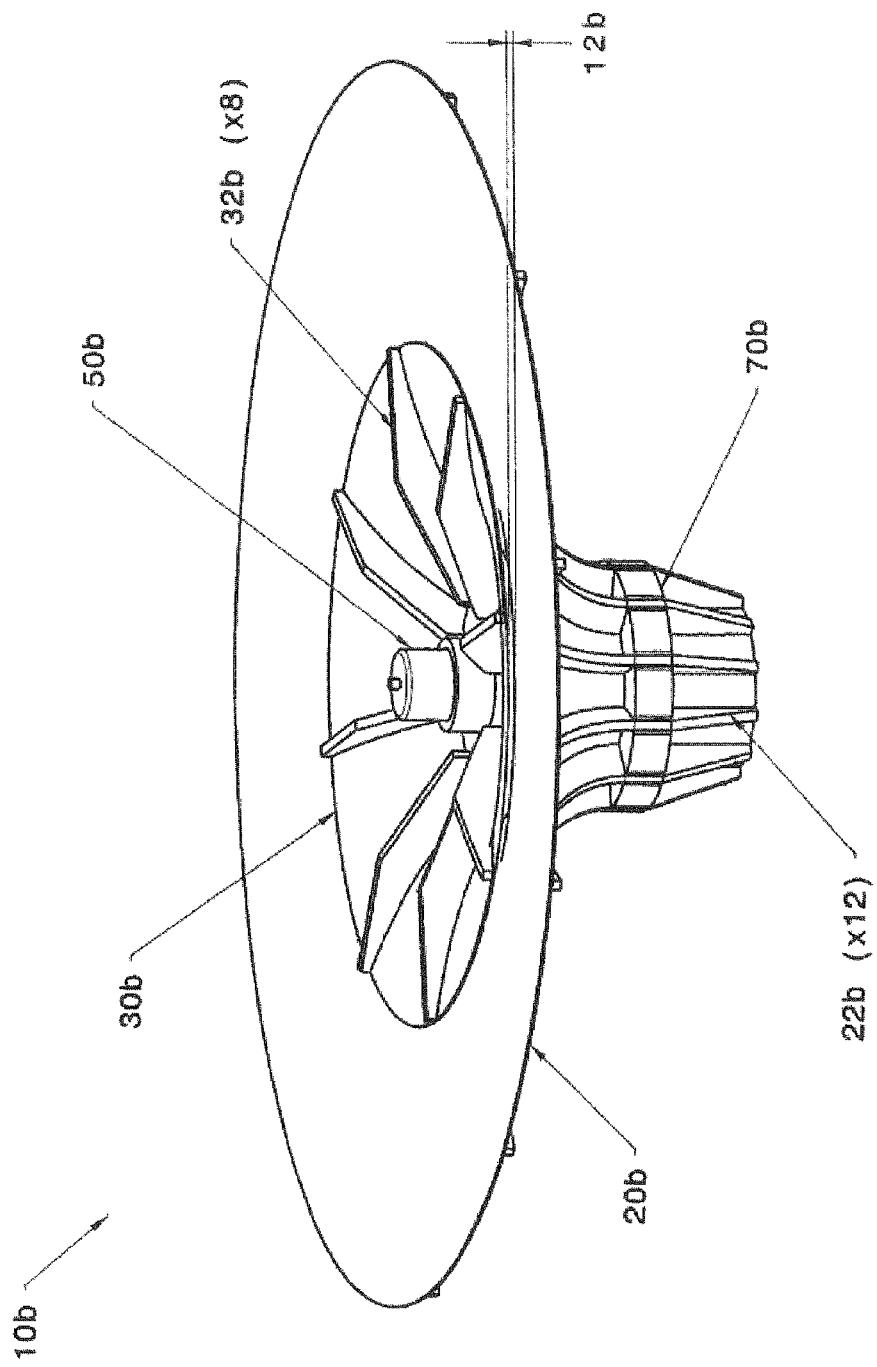
FIG. 10 illustrates an exemplary lift generating device configuration having a plurality of thin ribs attached to each revolution surface in accordance with an alternate embodiment.

FIG. 10 illustrates an exemplary lift generating device configuration having a plurality of thin ribs attached to each revolution surface in a light weight alternate embodiment. The lift generating device 10b includes lower revolution surface 20b that is held in place by a plurality of evenly distributed ribs 22b. Lower revolution surface 20b can be pasted or glued to the circular array of ribs 22b. Upper revolution structure 30b can be pasted or glued to a circular array of evenly distributed ribs 32b. Ribs 32b hold upper revolution structure 30b in place. Ribs 22b, 32b provide the required profile for both the upper and lower surfaces of revolution, so that the paper, fabric, or plastic can be glued or otherwise attached to the ribs. The upper and lower revolution structures form a gap 12b as shown. Motor 50b provides torque to lift generating device 10b. Connectors (not shown) are evenly distributed between the upper and lower revolution structures.

Figure 11:
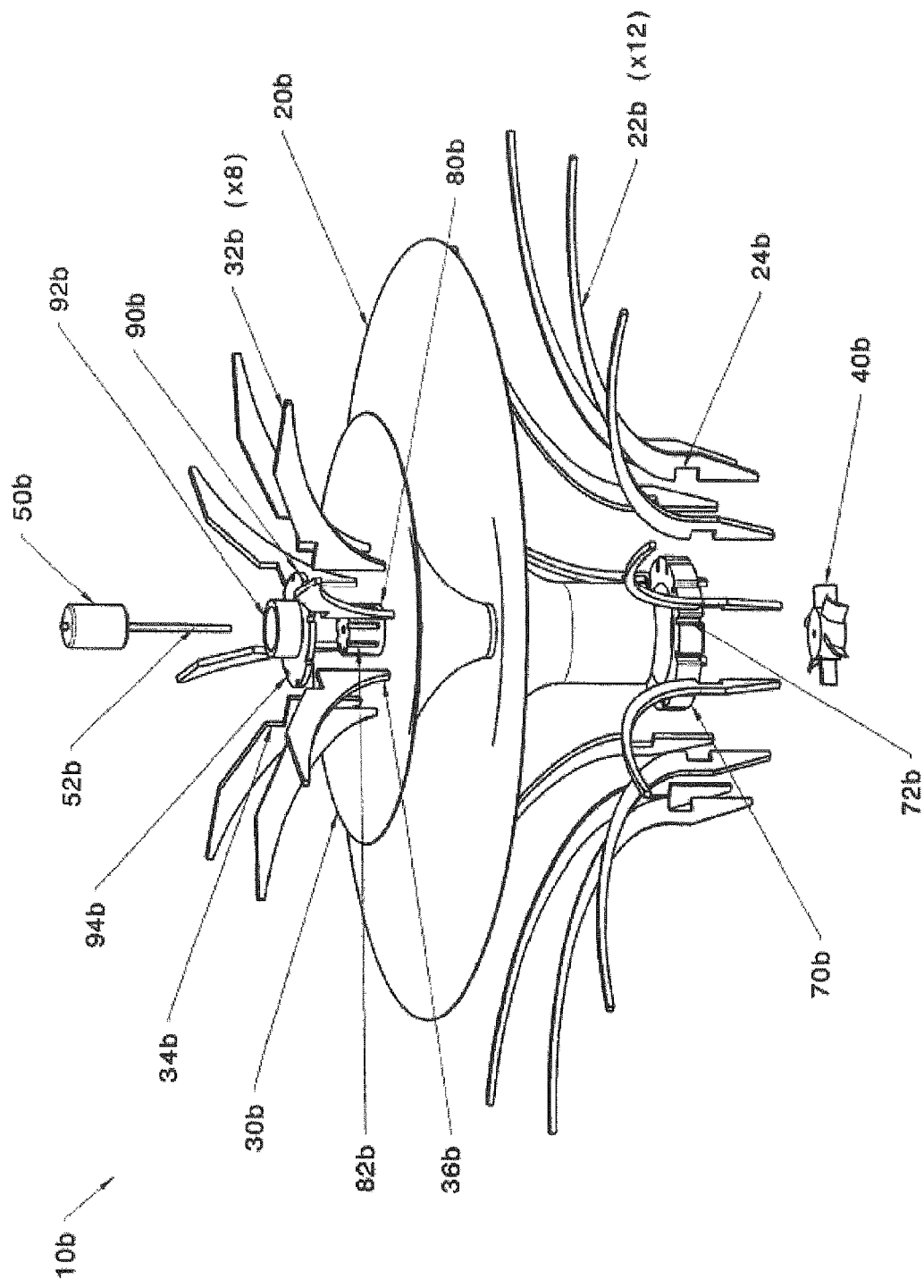
FIG. 11 illustrates an exploded view of the lift generating device configuration of FIG. 10.

FIG. 11 illustrates an exploded view of the lift generating device 10b in the embodiment of FIG. 10. Circular ring 70b holds ribs 22b in place. An incision 24b is made in each of the plurality of ribs 22b. A plurality of vertical incisions 72b is evenly distributed around circular ring 70b. The incisions 24b of ribs 22b can be inserted into the incisions of circular ring 70b in order to attach ribs 22b to circular ring 70b. Circular ring 80b holds ribs 32b in place. An incision 34b is made in each of the plurality of ribs 32b. A plurality of vertical incisions 82b is evenly distributed around circular ring 80b. Each rib 32b includes a bottom surface 36b that can be inserted into incisions 82b of circular ring 80b. Circular and symmetric part 90b holds the ribs 32b and the motor 50b in place. A plurality of vertical incisions 94b is evenly distributed around circular part 90b. The incisions 34b of ribs 32b can be inserted into the incisions of circular part 90b in order to attach ribs 32b to circular part 90b. Hollow base 92b holds motor 50b in place. Motor 50b provides torque to rotate propeller 40b. Motor 50b is mounted to shaft 52b that passes through circular part 90b and ring 80b and rotates propeller 40b. Propeller 40b is attached to shaft 52b below circular ring 80b.

Both the lower revolution structure 20b and upper revolution structure 30b of the lift generating device 10b could be made of a light and thin material such as fabric, paper or plastic. The ribs 22b, 32b could be made from, but are not limited to, wood, aluminum, plastic, carbon fiber, etc. Circular rings 70b, 80b could be made from, but are not limited to wood, aluminum, plastic, carbon fiber, etc. Circular and symmetric part 90b could be made from, but is not limited to wood, aluminum, plastic, carbon fiber, etc.

The following disclosure describes the mathematical analysis supporting the increased efficiency of propelling devices used for vertical flight by redirecting the airflow through a series of surfaces of revolution. The effective area of a propelling device can be described according to its circumference by its outer and inner radii ($R_o$ and $R_i$, respectively), where the inner radius describes the size of the axel where the blades connect. Therefore, the effective area can be expressed as $$A = (R_o^2 - R_i^2)\pi. \tag{1}$$

Figure 12:
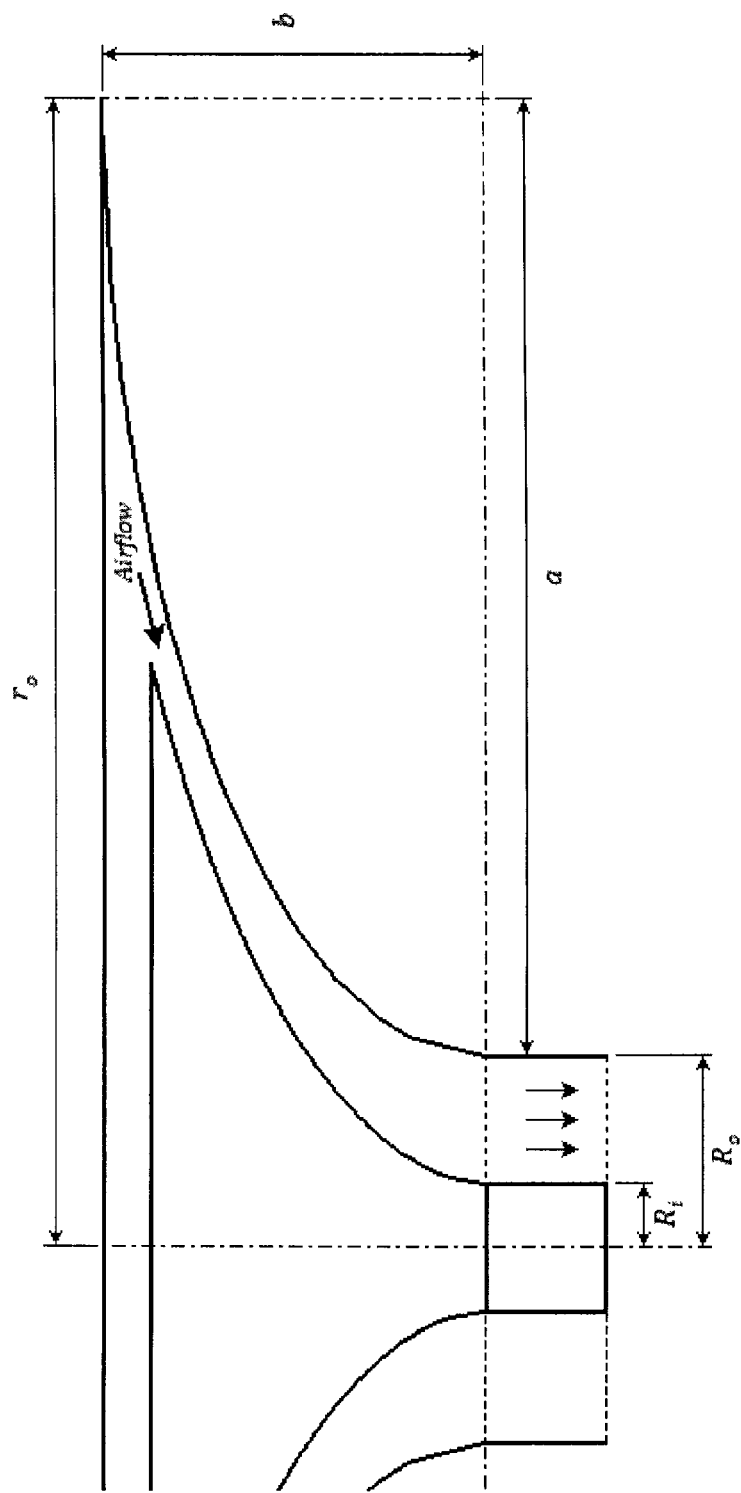
FIG. 12 illustrates geometric parameters of the lift generating configuration in an exemplary embodiment.

In order to generate lift by redirecting the airflow of a propelling device, the system has to make the air flow at a desired speed on top of a nearly horizontal surface so that a nearly vertical force is generated due to the fact that the pressure on the top side of the surface decreases, while it remains unchanged at the bottom. FIG. 12 illustrates geometric parameters of the lift generating configuration in an exemplary embodiment.

The lower surface can have any type of curve profile as long as it allows the air to "bend" from nearly horizontal at the entrance to vertical at the propelling device's outlet. One particular curve that complies with such requirement is a quarter of an ellipse, and the equation describing such curve is $$y(x) = b \cdot \sqrt{1 - \left(\frac{x - r_o}{a}\right)^2}, \tag{2}$$

for the same geometric parameters shown in FIG. 12 and where x is the horizontal distance from the rotation axis.

In order to provide the lowest pressure on top of the surface, the air should flow as fast as possible. Using the continuity equation for incompressible flow, $$A_1 v_1 = A_2 v_2, \tag{3}$$

it becomes evident that in order to increase the velocity, the area must decrease. However, if the air speed is faster at the inlet than at the outlet, a fraction of the consumed power will be lost when making the air flow through a smaller area. It seems that the best option would be to maintain the speed of the air constant at all times so that no power is lost. So, if the speed should remain constant, the effective area should remain constant as well, $$A_1 = A_2 = A = (R_o^2 - R_i^2)\pi. \qquad (4)$$

Figure 13:
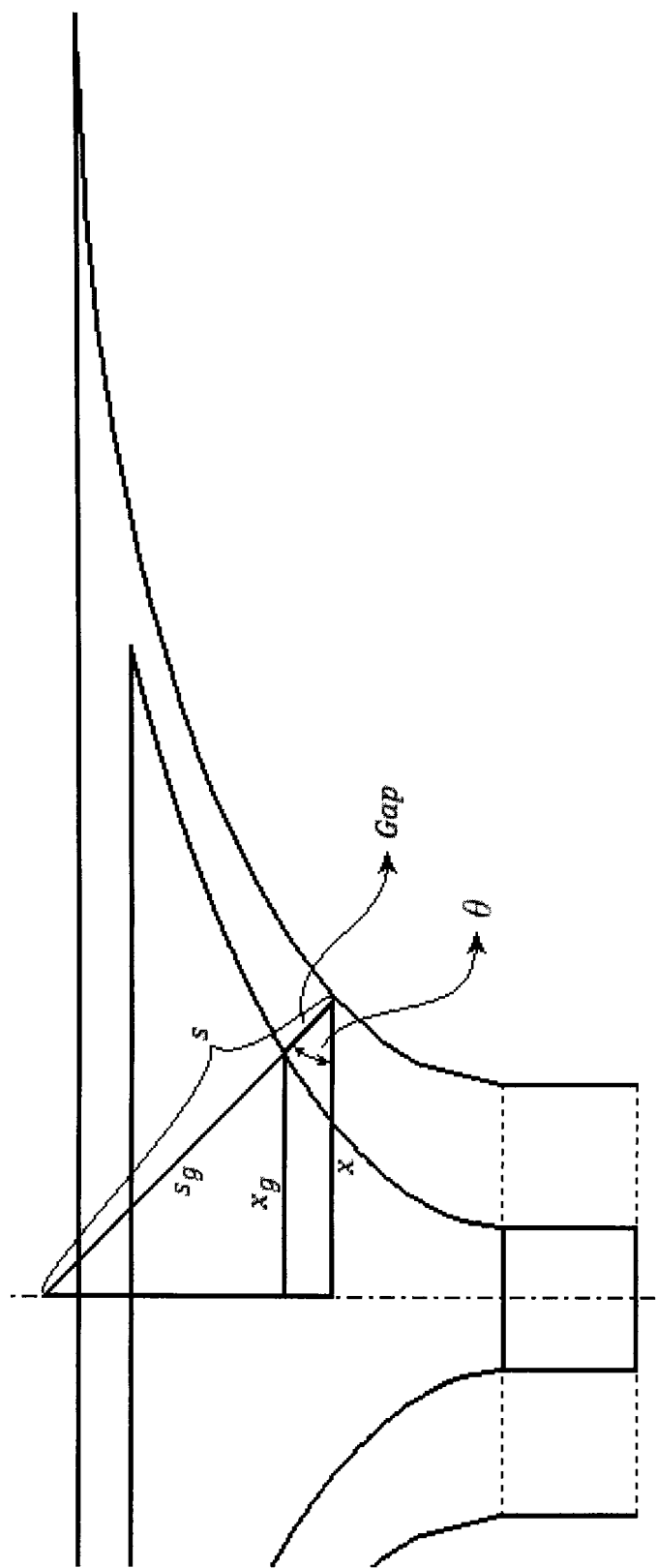
FIG. 13 illustrates the area of revolution of the gap between surfaces is the difference of the outer area between two similar cones.

Therefore, the profile of the upper surface depends on the profile of the lower surface: the closest distance between any point on the lower surface to a point on the upper surface represents the length of the gap between surfaces at that point, and the area of revolution of this gap around the central axis can be found as the difference in outer area of two similar cones, $$A_{gap} = (xs - x_g s_g)\pi, \qquad (5)$$

where $x$, $x_g$, $s$, and $s_g$ are the radii and slopes of the two similar cones. FIG. 13 illustrates the area of revolution of the gap between surfaces is the difference of the outer area between two similar cones.

It is possible to observe from FIG. 13 that, since both cones are similar, $$\cos\theta = \frac{x}{s} = \frac{x_g}{s_g}.$$

The area of the gap must remain constant, $$A_{gap} = A,$$

$$xs - x_g s_g = R_0^2 - R_i^2. \qquad (6)$$

In addition, since the gap is the closest distance between the surfaces, its direction must be normal (perpendicular) to the lower surface, and its magnitude is given by the difference between s and $s_g$. In order to obtain the normal vector describing the position and magnitude of the gap, the tangential vector must be found first. Taking the first derivative of Eq. (2), $$y'(x) = \frac{dy}{dx}, \qquad (7)$$

$$y'(x) = -\frac{b}{a^2}(x - r_o)\left[1 - \left(\frac{x - r_o}{a}\right)^2\right]^{-1/2}, \text{ or}$$

$$y'(x) = -\frac{b^2}{a^3}\left(\frac{x - r_o}{y}\right). \qquad (8)$$

Therefore, the magnitude of the tangent vector can be written as, $$|y'(x)| = \sqrt{1^2 + y'^2},$$

and the unit tangent vector becomes, $$v_t(x) = \left[\frac{1}{|y'|} \quad \frac{y'}{|y'|}\right].$$

The normal vector can be found from the derivative of the tangential vector, $$v_t'(x) = \left[\left(\frac{1}{|y'|}\right)' \quad \left(\frac{y'}{|y'|}\right)'\right]. \qquad (9)$$

The magnitude of the vector above is $$|v_t'(x)| = \sqrt{\left[\left(\frac{1}{|y'|}\right)'\right]^2 + \left[\left(\frac{y'}{|y'|}\right)'\right]^2}.$$

Thus, the normal unit vector is given by $$v_n(x) = \frac{v_t'}{|v_t'|}. \qquad (10)$$

Any point on the curve that describes the lower surface can be expressed as $$P = [x \, y(x)],$$

and the normal unit vector at that point is given by $$P_n = P - v_n(x), \qquad (11)$$

$$= [x_n \quad y_n(x_n)].$$

Therefore, it is possible to find the slope of the gap $$m = \frac{y(x) - y_n(x_n)}{x - x_n}.$$

The intersection with the central axis of rotation of the line with slope m that passes through point P is $$q(x) = y(x) - mx,$$

This intersection point is given by $$P_q = [0 \, q(x)],$$

so that it becomes possible to find the distance from $P_q$ to P(=s for the bigger cone)

$$s(x) = \sqrt{(q(x) - y(x))^2 + (0 - x)^2},$$

Rearranging equation (6) in order to find the dimensions of the smaller cone, $$x_g s_g = xs + R_i^2 - R_o^2.$$

Also, since ($x_g = s_g \cos\theta$) and ($\cos\theta = x/s$)

$$s_g^2 \cos\theta = xs + R_i^2 - R_o^2, \qquad (12)$$

$$s_g^2 = (xs + R_i^2 - R_o^2)\frac{1}{\cos\theta},$$

$$s_g = \sqrt{(xs + R_i^2 - R_o^2)\frac{s}{x}}.$$

Finally, the size of the gap is simply given by $$g = s - s_g. \qquad (13)$$

As a result, it is possible to find the coordinates of any point on the upper surface that is the closest to the lower surface given that the area of the gap must remain constant. The coordinates can be found as follows:

$$x_g = s_g \cos\theta \qquad (14)$$
$$= s_g \frac{x}{s},$$

$$y_g = q - \sqrt{s_g^2 - x_g^2} \qquad (15)$$
$$= q - s_g \sqrt{1 - \frac{x^2}{s^2}}.$$

These coordinates represent the points of the curve describing the optimized upper surface of revolution for a given value of x.

Figure 14:
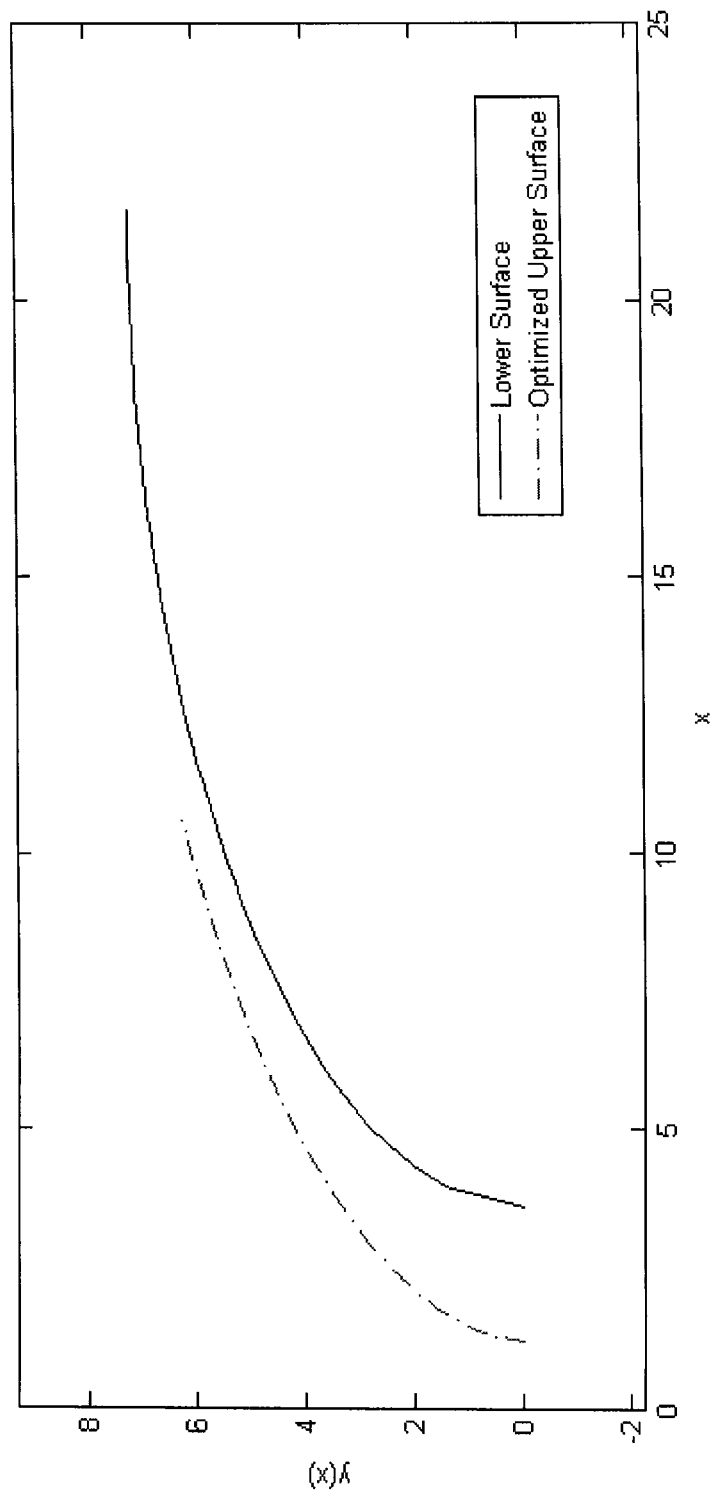
FIG. 14 illustrates a plot of the profiles for the upper and lower surfaces of revolution.

FIG. 14 shows the profiles for the lower surface and the optimized upper surface of revolution for the following parameters:

$$R_o=3.6, R_i=1.2, r_o=21.6, a=18, \text{ and } b=7.2.$$

Figure 15:
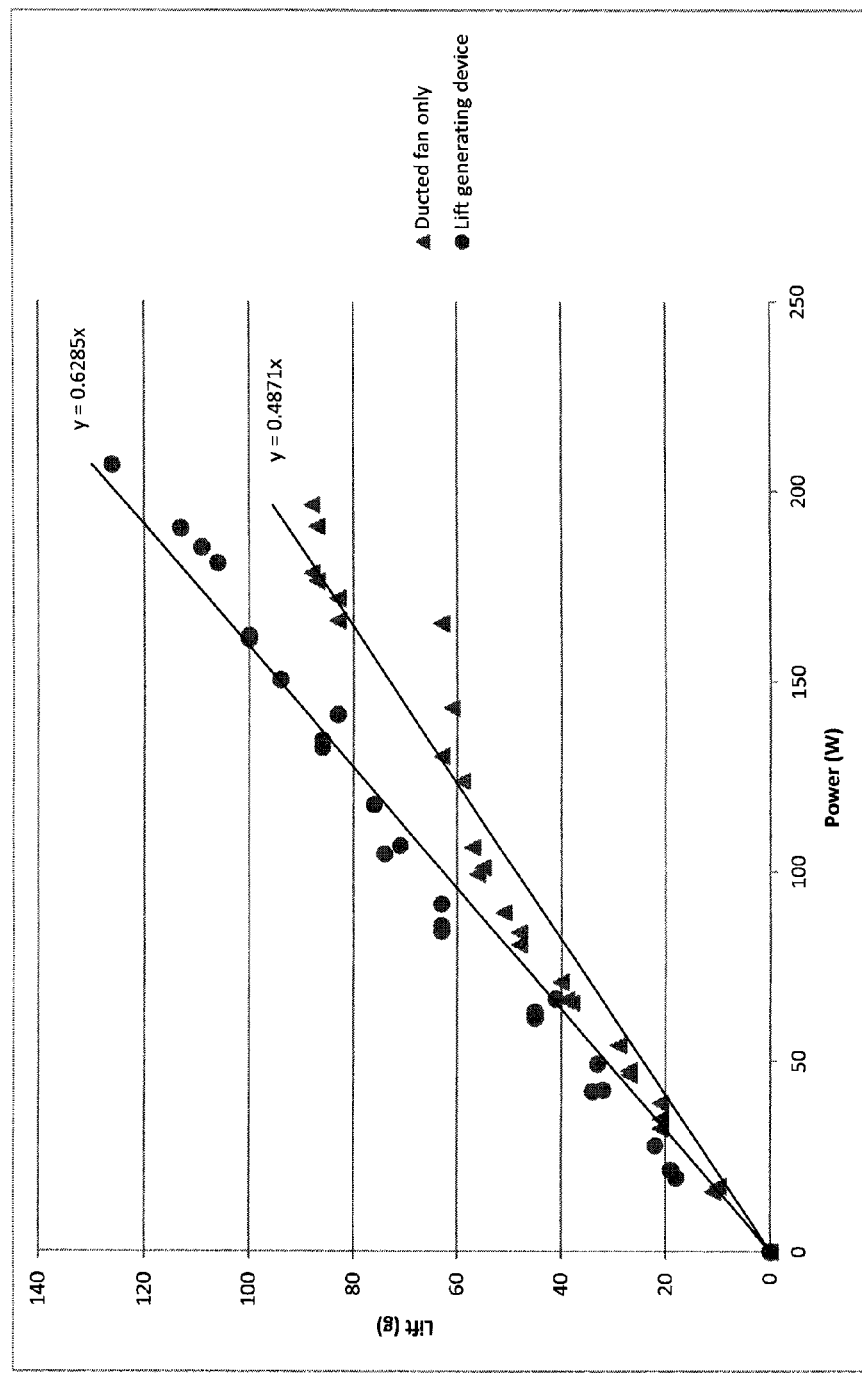
FIG. 15 illustrates lift versus power test results comparison between a ducted fan and the lift generating device.

In addition, some preliminary testing has been done in order to compare the efficiency of a propelling device vs. the efficiency of the new lift generating configuration. FIG. 15 shows the lift generated vs. power consumption results for a small ducted fan (lower plot) and for a rough prototype (non-optimized) of the device using the same ducted fan (upper plot).

It can be observed that the new lift generating device is about 29% more efficient than the ducted fan alone (even for a non-optimized prototype). This result clearly illustrates the potential benefits of implementing this configuration into VTOL and similar aircraft.

The corresponding structures, materials, acts, and equivalents of all mans plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A lift generating device for enabling vertical flight, comprising:
    a first revolution structure having a funnel shape and including a circular open surface and an open stem;
    a second revolution structure having a funnel shape and including an open surface and an open stem, the second revolution structure attached to the first revolution structure by a plurality of connectors and spaced therefrom so as to form a gap of a size sufficient to provide a selected air flow velocity between the first revolution structure and the second revolution structure;
    a propeller coupled to an open stem at a bottom end of the first revolution structure, the propeller being disposed between the first revolution structure and the second revolution structure; and
    a motor operatively connected to the propeller to provide power for the propeller to suction air into the lift generating device such that a pressure difference is created so as to generate an upward directed force.

2. A lift generating structure for enabling vehicle vertical flight comprising;
    a lift generating device including a funnel-shaped first revolution structure and a funnel-shaped second revolution structure, the first revolution structure mounted in the second revolution structure and separated by a predetermined gap, such that airflow on an upper side of the first revolution structure decreases air pressure on the lift generating device while air pressure on a lower side of the first revolution structure remains unchanged resulting in a lifting force; a propeller disposed between the first revolution structure and the second revolution structure for creating the airflow;
    a fuselage structure including a support bar having a rectangular cross section;
    a holding structure affixed to the fuselage structure for mounting of the lift generating device;
    a plurality of motor and propeller combinations for generating horizontal motion of the vehicle; and
    a plurality of side arms attached to the fuselage structure for supporting each of the motor and propeller combinations.

3. The lift generating structure of claim 2 further comprising a back motor mounted to the fuselage structure for generating a counter-rotation force.

4. The lift generating structure of claim 2 wherein the support bar includes a first end section and a second end section.

5. The lift generating structure of claim 4 wherein the holding structure comprises a horizontally-oriented annular component affixed to the first end section of the fuselage structure for mounting the lift generating device.

6. The lift generating structure of claim 4 further comprising a vertically-oriented annular holding structure affixed to the second end section of the fuselage structure for mounting the back motor.

7. The lift generating structure of claim 2 further comprising a plurality of connectors for attaching each of the motor and propeller combinations to the side arms.

8. The lift generating structure of claim 2 further comprising a vertical plate mounted to a side of the holding structure and a platform affixed to the vertical plate at a bottom section for supporting a payload.

* * * * *